US010210542B2

(12) United States Patent
Bass et al.

(10) Patent No.: US 10,210,542 B2
(45) Date of Patent: Feb. 19, 2019

(54) VENUE GUEST DEVICE MESSAGE PRIORITIZATION

(71) Applicant: Blazer and Flip Flops, Inc., San Diego, CA (US)

(72) Inventors: Joshua David Bass, Carlsbad, CA (US); Benjamin Harry Ziskind, San Diego, CA (US); Scott Sebastian Sahadi, Solana Beach, CA (US)

(73) Assignee: Blazer and Flip Flops, Inc., San Diego, CA (US)

( * ) Notice: Subject to any disclaimer, the term of this patent is extended or adjusted under 35 U.S.C. 154(b) by 312 days.

(21) Appl. No.: 14/632,884

(22) Filed: Feb. 26, 2015

(65) Prior Publication Data

US 2015/0242890 A1    Aug. 27, 2015

Related U.S. Application Data

(60) Provisional application No. 61/945,052, filed on Feb. 26, 2014.

(51) Int. Cl.
G06Q 30/00 (2012.01)
G06Q 30/02 (2012.01)
H04W 4/02 (2018.01)

(52) U.S. Cl.
CPC ..... *G06Q 30/0251* (2013.01); *G06Q 30/0252* (2013.01); *G06Q 30/0261* (2013.01); *G06Q 30/0267* (2013.01); *G06Q 30/0269* (2013.01); *H04W 4/02* (2013.01)

(58) Field of Classification Search
CPC ...................... G06Q 30/0207; G06Q 30/0251
USPC .......................................................... 705/14
See application file for complete search history.

(56) References Cited

U.S. PATENT DOCUMENTS

| 4,873,513 | A | 10/1989 | Soults et al. |
| 5,978,744 | A | 11/1999 | McBride |
| 6,142,368 | A | 11/2000 | Mullins et al. |
| 6,223,559 | B1 | 5/2001 | Coleman |
| 6,320,496 | B1 | 11/2001 | Sokoler et al. |
| 6,352,205 | B1 | 3/2002 | Mullins et al. |
| 6,369,840 | B1* | 4/2002 | Barnett ............ G06Q 10/06314 715/751 |
| 6,414,635 | B1 | 7/2002 | Stewart et al. |
| 6,474,557 | B2 | 11/2002 | Mullins et al. |

(Continued)

FOREIGN PATENT DOCUMENTS

| EP | 1 288 627 | 3/2003 |
| EP | 2 650 692 | 10/2013 |

(Continued)

OTHER PUBLICATIONS

PCT Application No. PCT/US2015/017827, International Search Report and Written Opinion dated Jun. 11, 2015.

(Continued)

*Primary Examiner* — Matthew L Hamilton
(74) *Attorney, Agent, or Firm* — Polsinelli LLP

(57) ABSTRACT

A system to improve end-user monetization in a captive audience environment is disclosed. Mobile and wearable users may be engaged by way of contextual and perishable messaging. Such messaging is dynamically updated and maintained to provide a unique messaging experience which increases monetization opportunities, which may utilize location based technologies.

19 Claims, 3 Drawing Sheets

(56) References Cited

U.S. PATENT DOCUMENTS

| | | |
|---|---|---|
| 6,493,630 B2 | 12/2002 | Ruiz et al. |
| 6,587,787 B1 | 7/2003 | Yokota |
| 6,663,006 B2 | 12/2003 | Mullins et al. |
| 6,687,608 B2 | 2/2004 | Sugimoto et al. |
| 6,997,380 B2 | 2/2006 | Safael et al. |
| 7,222,080 B2 | 5/2007 | Hale et al. |
| 7,558,678 B2 | 7/2009 | Jones |
| 7,802,724 B1 | 9/2010 | Nohr |
| 7,992,773 B1 | 8/2011 | Rothschild |
| 8,368,695 B2 | 2/2013 | Howell et al. |
| 8,424,752 B2 | 4/2013 | Rothschild |
| 8,427,510 B1 | 4/2013 | Towfiq et al. |
| 8,433,342 B2 | 4/2013 | Boyle et al. |
| 8,625,796 B1 | 1/2014 | Ben Ayed |
| 8,651,369 B2 | 2/2014 | Rothschild |
| 8,866,673 B2 | 10/2014 | Mendelson |
| 8,936,190 B2 | 1/2015 | Rothschild |
| 8,963,775 B2 | 2/2015 | Faragher |
| 9,264,849 B1 | 2/2016 | Kahn et al. |
| 9,488,085 B2 | 9/2016 | Bass |
| 9,485,322 B2 | 11/2016 | Krishnaswamy et al. |
| 9,491,584 B1 | 11/2016 | Mendelson |
| 9,674,684 B1 | 6/2017 | Mendelson |
| 9,741,022 B2 | 8/2017 | Ziskind |
| 9,813,855 B2 | 11/2017 | Sahadi |
| 9,813,862 B2 | 11/2017 | Liu et al. |
| 9,829,339 B2 | 11/2017 | Bass |
| 9,906,909 B2 | 2/2018 | Sahadi |
| 9,909,896 B2 | 3/2018 | Bass |
| 10,028,091 B2 | 7/2018 | Sahadi |
| 10,129,728 B2 | 11/2018 | Sahadi |
| 10,149,103 B2 | 12/2018 | Sahadi |
| 2002/0007292 A1 | 1/2002 | Paxton et al. |
| 2002/0029226 A1 | 3/2002 | Li et al. |
| 2002/0055863 A1* | 5/2002 | Behaylo ............... G06Q 10/02 705/5 |
| 2002/0194246 A1* | 12/2002 | Moskowitz .......... G06Q 10/109 718/102 |
| 2003/0007464 A1 | 1/2003 | Balani |
| 2004/0224703 A1 | 11/2004 | Takaki et al. |
| 2005/0114014 A1 | 5/2005 | Isaac |
| 2006/0074550 A1 | 4/2006 | Freer et al. |
| 2006/0087474 A1 | 4/2006 | Do et al. |
| 2006/0106850 A1 | 5/2006 | Morgan et al. |
| 2007/0032269 A1 | 2/2007 | Shostak |
| 2007/0118415 A1 | 5/2007 | Chen et al. |
| 2007/0174115 A1 | 7/2007 | Chieu et al. |
| 2007/0197247 A1* | 8/2007 | Inselberg ............. G06Q 30/02 455/517 |
| 2007/0225904 A1 | 9/2007 | Patanlone et al. |
| 2007/0239348 A1* | 10/2007 | Cheung ............. G01C 21/3423 701/467 |
| 2007/0270166 A1 | 11/2007 | Hampel et al. |
| 2008/0059889 A1 | 3/2008 | Parker et al. |
| 2008/0067244 A1 | 3/2008 | Marks |
| 2008/0183582 A1 | 7/2008 | Major |
| 2008/0186164 A1 | 8/2008 | Emigh et al. |
| 2008/0290182 A1 | 11/2008 | Bell et al. |
| 2008/0306826 A1* | 12/2008 | Kramer ............... G06Q 30/02 705/14.14 |
| 2008/0312946 A1 | 12/2008 | Valentine et al. |
| 2009/0017798 A1 | 1/2009 | Pop |
| 2009/0027418 A1 | 1/2009 | Maru et al. |
| 2009/0055208 A1 | 2/2009 | Kaiser |
| 2009/0089131 A1 | 4/2009 | Moukas et al. |
| 2009/0265428 A1 | 10/2009 | Light et al. |
| 2009/0319306 A1* | 12/2009 | Chanick ............. G01C 21/3679 705/5 |
| 2009/0319616 A1 | 12/2009 | Lewis et al. |
| 2010/0037141 A1 | 2/2010 | Carter et al. |
| 2010/0042320 A1 | 2/2010 | Salmre et al. |
| 2010/0063854 A1* | 3/2010 | Purvis ............... G06Q 10/02 705/5 |
| 2010/0077036 A1 | 3/2010 | DeLuca et al. |
| 2010/0161432 A1* | 6/2010 | Kumanov ............ G06Q 20/102 705/15 |
| 2010/0194784 A1 | 8/2010 | Hoff et al. |
| 2011/0054976 A1 | 3/2011 | Adler et al. |
| 2011/0078026 A1* | 3/2011 | Durham ................ G06Q 30/02 705/14.66 |
| 2011/0090123 A1 | 4/2011 | Sridhara et al. |
| 2011/0136507 A1 | 6/2011 | Hauser et al. |
| 2011/0173545 A1 | 7/2011 | Meola |
| 2011/0221745 A1 | 9/2011 | Golman et al. |
| 2011/0231235 A1* | 9/2011 | MacIlwaine ......... G06Q 20/387 705/14.17 |
| 2011/0246148 A1 | 10/2011 | Gupta et al. |
| 2011/0267369 A1 | 11/2011 | Olsen et al. |
| 2012/0024947 A1 | 2/2012 | Naelon |
| 2012/0069131 A1 | 3/2012 | Abelow |
| 2012/0081250 A1 | 4/2012 | Farrokhi et al. |
| 2012/0096490 A1 | 4/2012 | Barnes |
| 2012/0166960 A1 | 6/2012 | Salles |
| 2012/0172055 A1 | 7/2012 | Edge |
| 2012/0179764 A1 | 7/2012 | Erdal |
| 2012/0182933 A1 | 7/2012 | Bandhakavi |
| 2012/0191497 A1 | 7/2012 | Patterson |
| 2012/0197690 A1* | 8/2012 | Agulnek ............. G01C 21/3697 705/14.1 |
| 2012/0197720 A1* | 8/2012 | Bezancon ........... G06O 30/0255 705/14.53 |
| 2012/0214515 A1 | 8/2012 | Davis et al. |
| 2012/0239504 A1 | 9/2012 | Curlander et al. |
| 2012/0270573 A1 | 10/2012 | Marti et al. |
| 2012/0271691 A1 | 10/2012 | Hammad et al. |
| 2012/0274642 A1 | 11/2012 | Ofek et al. |
| 2012/0284117 A1 | 11/2012 | Karandikar |
| 2013/0012235 A1 | 1/2013 | Burdo et al. |
| 2013/0024203 A1* | 1/2013 | Flores .................. G06Q 30/02 705/1.1 |
| 2013/0024265 A1 | 1/2013 | Lotzof |
| 2013/0030875 A1 | 1/2013 | Lee et al. |
| 2013/0036455 A1 | 2/2013 | Bodi et al. |
| 2013/0052990 A1 | 2/2013 | Zhang |
| 2013/0059603 A1 | 3/2013 | Guenec et al. |
| 2013/0073381 A1* | 3/2013 | Binkley ............... G06Q 30/02 705/14.48 |
| 2013/0085834 A1* | 4/2013 | Witherspoon, Jr. ... G06Q 30/02 705/14.32 |
| 2013/0091452 A1 | 4/2013 | Sorden et al. |
| 2013/0124234 A1 | 5/2013 | Nilsson et al. |
| 2013/0132230 A1 | 5/2013 | Gibson et al. |
| 2013/0137464 A1 | 5/2013 | Kramer et al. |
| 2013/0157655 A1 | 6/2013 | Smith et al. |
| 2013/0158867 A1 | 6/2013 | Sidhu et al. |
| 2013/0173377 A1* | 7/2013 | Keller .................. G06Q 50/01 705/14.35 |
| 2013/0173393 A1* | 7/2013 | Calman ............. G06Q 30/0207 705/14.66 |
| 2013/0191213 A1 | 7/2013 | Beck et al. |
| 2013/0225282 A1 | 8/2013 | Williams et al. |
| 2013/0231135 A1 | 9/2013 | Garskof |
| 2013/0267260 A1 | 10/2013 | Chao et al. |
| 2013/0279543 A1 | 10/2013 | Torimoto et al. |
| 2013/0281084 A1 | 10/2013 | Batada et al. |
| 2013/0317944 A1 | 11/2013 | Huang et al. |
| 2013/0339073 A1* | 12/2013 | Dabbiere ........... G06Q 30/0223 705/7.12 |
| 2014/0025466 A1 | 1/2014 | Borton et al. |
| 2014/0058766 A1* | 2/2014 | Yu ....................... G06Q 10/109 705/5 |
| 2014/0067544 A1* | 3/2014 | Klish .................. G06Q 30/02 705/14.66 |
| 2014/0073363 A1 | 3/2014 | Tidd et al. |
| 2014/0074593 A1* | 3/2014 | Chomsky ........... G06Q 30/0276 705/14.45 |
| 2014/0082509 A1 | 3/2014 | Roumeliotis et al. |
| 2014/0118113 A1* | 5/2014 | Kaushik ............... H04W 12/12 340/8.1 |
| 2014/0122040 A1 | 5/2014 | Marti |
| 2014/0128103 A1 | 5/2014 | Joao et al. |
| 2014/0129266 A1 | 5/2014 | Perl et al. |

(56) References Cited

U.S. PATENT DOCUMENTS

| | | |
|---|---|---|
| 2014/0132772 A1 | 5/2014 | Billau et al. |
| 2014/0162693 A1 | 6/2014 | Wachter et al. |
| 2014/0164761 A1 | 6/2014 | Kufluk et al. |
| 2014/0188614 A1 | 7/2014 | Badenhop |
| 2014/0189802 A1 | 7/2014 | Montgomery |
| 2014/0207509 A1* | 7/2014 | Yu ............... G06Q 10/1095 705/7.19 |
| 2014/0228060 A1 | 8/2014 | Abhyanker |
| 2014/0237076 A1 | 8/2014 | Goldman et al. |
| 2014/0244332 A1 | 8/2014 | Mermelstein |
| 2014/0253383 A1 | 9/2014 | Rowitch |
| 2014/0256357 A1* | 9/2014 | Wang ............... H04W 4/02 455/456.3 |
| 2014/0257991 A1* | 9/2014 | Christensen ....... G06Q 30/0241 705/14.66 |
| 2014/0278054 A1 | 9/2014 | Tidd et al. |
| 2014/0292481 A1 | 10/2014 | Dumas et al. |
| 2014/0342760 A1 | 11/2014 | Moldavsky et al. |
| 2015/0028996 A1 | 1/2015 | Agrafioti et al. |
| 2015/0035644 A1 | 2/2015 | June et al. |
| 2015/0038171 A1 | 2/2015 | Uilecan et al. |
| 2015/0052460 A1 | 2/2015 | Mohammad Mirzaei et al. |
| 2015/0058133 A1 | 2/2015 | Roth et al. |
| 2015/0074558 A1* | 3/2015 | Haskins ............... H04W 4/21 715/753 |
| 2015/0080014 A1 | 3/2015 | Ben-Yosef et al. |
| 2015/0081348 A1 | 3/2015 | Avera et al. |
| 2015/0100398 A1* | 4/2015 | Narayanaswami ................. G06Q 30/0236 705/14.16 |
| 2015/0112841 A1* | 4/2015 | Ivanovic ............ G06Q 30/0627 705/26.63 |
| 2015/0127445 A1* | 5/2015 | Jaffee ............... G06Q 30/0224 705/14.25 |
| 2015/0154674 A1* | 6/2015 | Todasco ............ G06Q 30/0613 705/26.41 |
| 2015/0176997 A1 | 6/2015 | Pursche et al. |
| 2015/0181384 A1 | 6/2015 | Mayor et al. |
| 2015/0222935 A1 | 8/2015 | King et al. |
| 2015/0229626 A1 | 8/2015 | Hauhn |
| 2015/0233715 A1 | 8/2015 | Xu et al. |
| 2015/0237473 A1 | 8/2015 | Koepke |
| 2015/0241238 A1 | 8/2015 | Bass |
| 2015/0242890 A1 | 8/2015 | Bass et al. |
| 2015/0244725 A1 | 8/2015 | Ziskind |
| 2015/0262086 A1* | 9/2015 | Mader ............... G06Q 30/0613 705/5 |
| 2015/0262216 A1* | 9/2015 | Aziz ............... G06Q 30/0235 705/14.35 |
| 2015/0294303 A1 | 10/2015 | Hanson et al. |
| 2015/0296347 A1 | 10/2015 | Roth |
| 2015/0334569 A1 | 11/2015 | Rangarajan et al. |
| 2015/0334676 A1 | 11/2015 | Hart et al. |
| 2016/0005003 A1 | 1/2016 | Norris et al. |
| 2016/0050526 A1 | 2/2016 | Liu et al. |
| 2016/0063537 A1* | 3/2016 | Kumar Goel ...... G06Q 30/0244 705/14.43 |
| 2016/0078370 A1 | 3/2016 | McEwen et al. |
| 2016/0105644 A1 | 4/2016 | Smith et al. |
| 2016/0127351 A1 | 5/2016 | Smith et al. |
| 2016/0150370 A1* | 5/2016 | Gillespie ............... H04W 4/021 455/456.3 |
| 2016/0242010 A1* | 8/2016 | Parulski ............... H04W 4/04 |
| 2016/0286361 A1 | 9/2016 | Ciecko |
| 2016/0300192 A1* | 10/2016 | Zamer ............... G06Q 10/1095 |
| 2016/0316324 A1 | 10/2016 | Sahadi |
| 2016/0321548 A1 | 11/2016 | Ziskind |
| 2016/0323708 A1 | 11/2016 | Sahadi |
| 2017/0010119 A1 | 1/2017 | Bass |
| 2017/0011348 A1 | 1/2017 | Ziskind |
| 2017/0161720 A1 | 6/2017 | Xing et al. |
| 2017/0162006 A1 | 6/2017 | Sahadi |
| 2017/0169449 A1 | 6/2017 | Heaven et al. |
| 2017/0237820 A1 | 8/2017 | Scarborough et al. |
| 2017/0248438 A1 | 8/2017 | Bass |
| 2017/0372270 A1 | 12/2017 | Ziskind |
| 2018/0005194 A1* | 1/2018 | Dotan-Cohen .... G06Q 10/1095 |
| 2018/0012195 A1* | 1/2018 | Nagaraj ................. G06Q 10/10 |
| 2018/0124559 A1 | 5/2018 | Sahadi |
| 2018/0192248 A1 | 7/2018 | Sahadi |

FOREIGN PATENT DOCUMENTS

| | | | |
|---|---|---|---|
| WO | WO-2011115855 A2 * | 9/2011 | ............ G06Q 30/00 |
| WO | WO 2011/159811 | 12/2011 | |
| WO | WO 2013/163444 | 10/2013 | |
| WO | WO 2015/017442 | 2/2015 | |
| WO | WO 2015/130969 | 9/2015 | |
| WO | WO 2015/130971 | 9/2015 | |
| WO | WO 2016/172731 | 10/2016 | |
| WO | WO 2016/176506 | 11/2016 | |
| WO | WO 2016/179098 | 11/2016 | |
| WO | WO 2017/100801 | 6/2017 | |

OTHER PUBLICATIONS

U.S. Appl. No. 15/271,087, Joshua D. Bass, Live Branded Dynamic Mapping.
PCT Application No. PCT/US2016/067582, International Search Report and Written Opinion dated Mar. 17, 2017.
U.S. Appl. No. 14/633,015 Office Action dated Apr. 13, 2017.
U.S. Appl. No. 15/138,157 Office Action dated Mar. 9, 2017.
U.S. Appl. No. 15/144,359 Office Action dated Apr. 5, 2017.
U.S. Appl. No. 14/633,019 Final Office Action dated Nov. 10, 2016.
U.S. Appl. No. 15/383,710, filed Dec. 19, 2016, Scott S. Sahadi, Wearable Device.
PCT/US16/67582, Wearable Device, filed Dec. 19, 2016.
U.S. Appl. No. 14/632,872 Office Action dated Mar. 7, 2016.
U.S. Appl. No. 14/633,019 Office Action dated May 6, 2016.
Feng et al., Yue ; "Effective venue image retrieval using robust feature extraction and model constrained matching for mobile robot localization", Machine Vision and Applications, DOI 10.1007/s00138-011-0350-z, Oct. 28, 2010.
Krueger, Robert; Thom, Dennis; Ertl, Thomas; "Visual Analysis of Movement Behavior using Web Data for Context Enrichment" Institute for Visualization and Interactive Systems (VIS), Published in *Pacific Visualization Symposium (Pacific Vis)*, 2014 IEEE, pp. 193-200.IEEE, 2014.
Sim, Robert; Dudek, Gregory; "Effective Exploration Strategies for the Construction of Visual Maps", Centre for Intelligent Machines, Published in: Intelligent Robots and Systems, 2003. (IROS 2003). Proceedings. 2003 IEEE/RSJ International Conference on (vol. 4) Date of Conference: Oct. 27-31, 2003.
PCT Application No. PCT/US2004/12667, International Search Report dated Oct. 29, 2004.
PCT Application No. PCT/US2016/029260, International Search Report and Written Opinion dated Jul. 27, 2016.
PCT Application No. PCT/US2016/029880, International Search Report and Written Opinion dated Jul. 27, 2016.
PCT Application No. PCT/US2016/030424, International Search Report and Written Opinion dated Jul. 29, 2016.
PCT Application No. PCT/US2015/017829, International Search Report and Written Opinion dated Jun. 8, 2015.
U.S. Appl. No. 15/383,710 Office Action dated Aug. 16, 2017.
U.S. Appl. No. 15/271,087 Office Action dated Jun. 7, 2017.
U.S. Appl. No. 15/597,609 Office Action dated Jul. 10, 2017.
U.S. Appl. No. 15/906,285, Scott S. Sahadi, Map Based Beacon Management.
U.S. Appl. No. 15/805,014, Scott S. Sahadi, Targeted Venue Message Distribution, filed Nov. 6, 2017.
U.S. Appl. No. 15/805,014 Office Action dated Apr. 5, 2018.
U.S. Appl. No. 14/633,015 Office Action dated Jun. 25, 2018.
European Patent Application 15754659.9 Extended European Search Report dated Sep. 29, 2017.
U.S. Appl. No. 15/906,285 Office Action dated May 9, 2018.
U.S. Appl. No. 15/597,609, Joshua D. Bass, Live Branded Dynamic Mapping, filed May 7, 2017.

(56) References Cited

OTHER PUBLICATIONS

U.S. Appl. No. 15/683,620, Benjamin H. Ziskind, Parental Controls, filed Aug. 22, 2017.
U.S. Appl. No. 14/633,015 Final Office Action dated Dec. 28, 2017.
U.S. Appl. No. 15/683,620 Office Action dated Feb. 22, 2018.
U.S. Appl. No. 15/383,710 Final Office Action dated Jan. 30, 2018.
Testa et al., Leonard; "Evolving Efficient Theme Parks Tours", Journal of Computing and Info Tech-CIT 7, 1999, 1, 77-92.
U.S. Appl. No. 15/141,780 Office Action dated Oct. 1, 2018.
European Patent Application 16789894.9 Extended European Search Report dated Oct. 17, 2018.

* cited by examiner

VENUE GUEST DEVICE MESSAGE PRIORITIZATION

CROSS REFERENCE TO RELATED APPLICATIONS

The present application claims the priority benefit of U.S. provisional application No. 61/945,052 filed Feb. 26, 2014 and entitled "System and Method for Increasing Customer Monetization," the disclosure of which is incorporated herein by reference.

BACKGROUND

Field of the Invention

The present invention is generally related to web services. More specifically, the present invention concerns a web service platform to improve end-user monetization in a captive audience environment.

Description of the Related Art

Venues such as theme parks, cruise ships, universities, arenas, resorts, and stadiums are a popular attractions that host thousands of people on a daily basis. Most of these venues provide static paper maps or signs that are meant to allow guests to explore the venue, encourage engagement in one or more activities at the venue, and otherwise attempt to maximize enjoyment while on the premises. These venues will often have other special events such as concerts, merchandise, culinary, or souvenir sales, and other limited time or new events that are of potential interest to their visitors. It is difficult, if not impossible, to track and communicate with visitors concerning these special events when they are provided only with a paper map upon entrance into such an event. While signage, flyers, or commercials outside the venue might help communicate this information, there is no means to communicate this information in real-time, especially for last minute events and offers. Even when a venue has sufficient notice of the event such that they might be better prepared to communicate to a customer, it would require the generation of new or one-time static maps that prove wasteful in terms of initial redesign (and the resources needed for the same) in addition to requiring a further printing with the risk that the print order will be too short or in excessive.

There is a need in the art for improved customer communications. Such an improvement is needed such that venues might the overall user experience, better engage with and service customers, track customer needs, and ultimately improve monetization from the user presence at the venue.

SUMMARY OF THE PRESENTLY CLAIMED INVENTION

In a first claimed embodiment of the present invention, a method for engaging with a user within a venue is described. Through the claimed methodology, a first rule is set for a promotion. The rule indicates whether the promotion will be available to each of a plurality of users within a venue. The promotion is then communicated to a plurality of users that correspond to the aforementioned rule. The promotion is then updated for at least one of the plurality of users having received the promotion, the update occurring before termination of the promotion.

DETAILED DESCRIPTION

The present invention includes a web service platform to improve end-user monetization inside or outside of a captive audience environment. Mobile and web-based clients allow application users to send and receive messages, including contextual and perishable messaging. Messaging is dynamically updated and maintained to provide a unique messaging experience that increases monetization opportunities for an entertainment venue implementing the platform.

The present invention further allows for hyper-local engagement on a region-by-region, neighborhood-by-neighborhood, or even brand-by-brand basis. For example, the present invention could be implemented not only in a theme park, but on a university campus. The platform could likewise be implemented in the context of a neighborhood such as San Francisco's Mission District or San Diego's North Park neighborhood. By engaging on a hyper-local level, the present messaging platform can better target users and improve upon business to consumer brand engagement.

Figure 1:
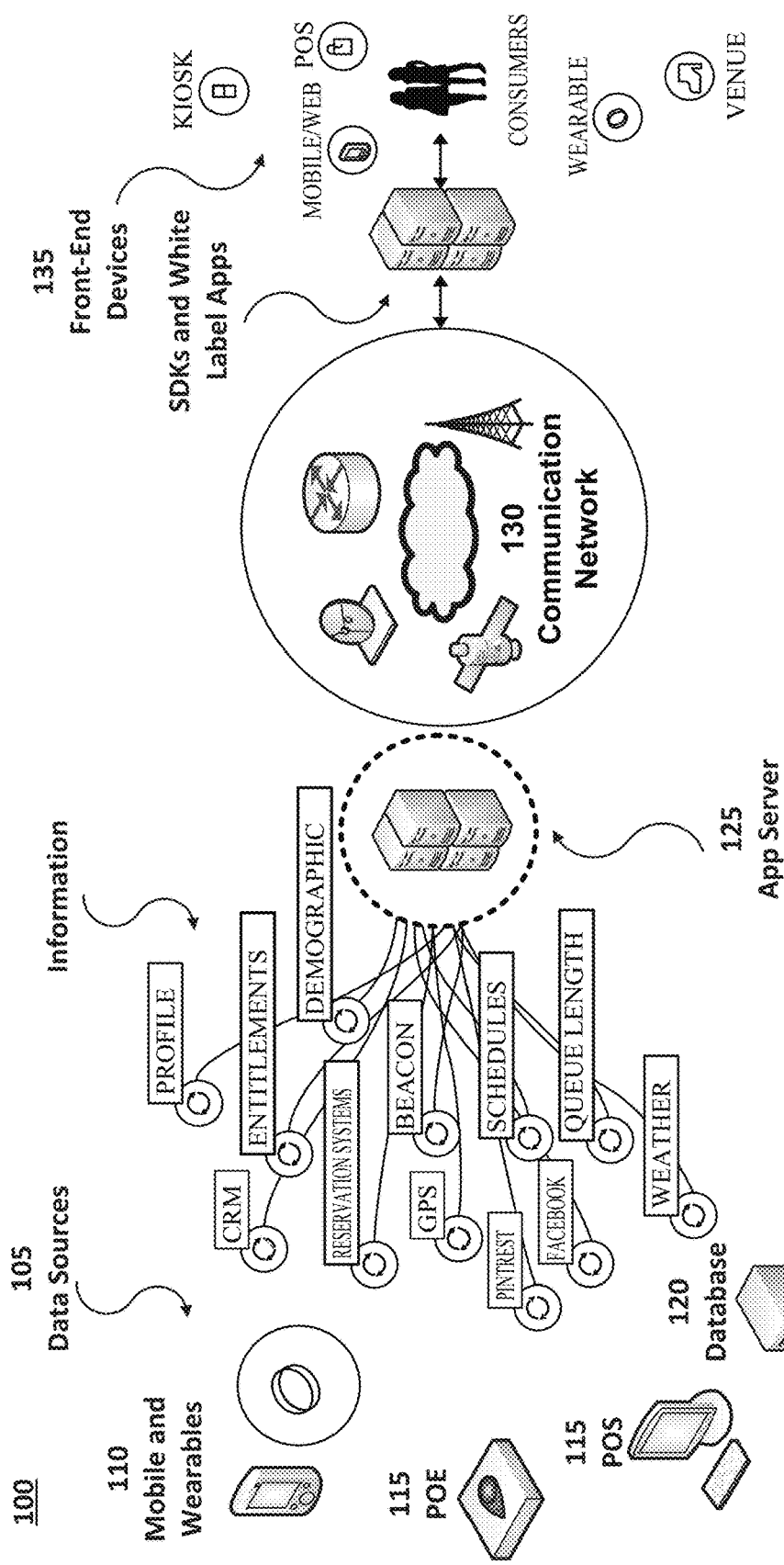
FIG. 1 illustrates a system for increasing customer engagement, including customer monetization.

FIG. 1 illustrates a system 100 for increasing customer engagement, including customer monetization. The system 100 of FIG. 1 includes an ecosystem of data sources 105 such as mobile devices 110, point-of-sale (POS) or point-of-entry/-exit (POE) terminals 115, and databases 120. Communicatively coupled to data sources 105 are back-end application servers 125. In system 100, application servers 125 can ingest, normalize and process data collected from mobile devices 110 and various POS or POE terminals 115. Types of information gathered from data sources 105 and processed by back-end application servers 125 are generally inclusive of identity (e.g., user profiles, CRM data, entitlements, demographics, reservation systems and social media sources like Pintrest and Facebook), proximity (e.g., GPS and beacons), and time (e.g., schedules, weather, and queue length).

Mobile devices 110 can execute an application on a user mobile device that shares customer engagement data such as current and prior physical locale within a venue as well as wait times and travel times (e.g., how long was a customer at a particular point in a venue and how long did it take the customer to travel to a further point in a venue). Mobile devices 110 are inclusive of wearable devices. Wearable devices (or 'wearables') are any type of mobile electronic device that can be worn on the body or attached to or embedded in clothes and accessories of an individual. Processors and sensors associated with a wearable can gather, process, display, and transmit and receive information.

POS data may be gathered at a sales terminal 115 that may interact with a mobile or wearable device 110 to track customer purchase history at a venue or preference for engagement at a particular locale within the venue. POE terminals 115 may provide data related to venue traffic flow, including entry and exit data that can be inclusive of time and volume. POE terminals 115 may likewise interact with mobile and wearable devices 110.

Historical data may also be accessed at databases 120 as a part of the application server 125 processing operation. The results of a processing or normalization operation may likewise be stored for later access and use. Processing and normalization results may also be delivered to front-end applications (and corresponding application servers) that allow for the deployment of contextual experiences and provide a network of services to remote devices as is further described herein.

The present system 100 may be used with and communicate with any number of external front-end devices 135 by way of communications network 130. Communication network 130 may be a local, proprietary network (e.g., an intranet) and/or may be a part of a larger wide-area network. Communication network 130 may include a variety of connected computing device that provide one or more elements of a network-based service. The communications network 130 may include actual server hardware or virtual hardware simulated by software running on one or more actual machines thereby allowing for software controlled scaling in a cloud environment.

Communication network 130 allows for communication between data sources 105 and front-end devices 135 via any number of various communication paths or channels that collectively make up network 130. Such paths and channels may operate utilizing any number of standards or protocols including TCP/IP, 802.11, Bluetooth, GSM, GPRS, 4G, and LTE. Communications network 130 may be a local area network (LAN) that can be communicatively coupled to a wide area network (WAN) such as the Internet operating through one or more network service provider.

Information received and provided over communications network 130 may come from other information systems such as the global positioning system (GPS), cellular service providers, or third-party service providers such as social networks. The system 100 can measure location and proximity using hardware on a user device (e.g., GPS) or collect the data from fixed hardware and infrastructure such as Wi-Fi positioning systems and Radio Frequency ID (RFID) readers. An exemplary location and proximity implementation may include a Bluetooth low-energy beacon with real time proximity detection that can be correlated to latitude/longitude measurements for fixed beacon locations.

Additional use cases may include phone-based, GPS, real-time location (latitude/longitude) measurements, phone geo-fence-real time notifications when a device is moving into or out of location regions, Wi-Fi positioning involving user location detection based on Wi-Fi signal strength (both active or passive), RFID/Near Field Communication (NFC), and cellular tower positioning involving wide range detection of user device location, which may occur at the metro-level.

Front-end devices 135 are inclusive of kiosks, mobile devices, wearable devices, venue devices, captive portals, digital signs, and POS and POE devices. It should be noted that each of these external devices may be used to gather information about one or more consumers at a particular location during a particular time. Thus, a device that is providing information to a customer on the front-end (i.e., a front-end device 135) such as a mobile device executing an application or a specially designed wearable can also function as a data source 105 as described above.

The system 100 of FIG. 1 provides services to connect venue management with visitors and entertainment consumers while simultaneously providing a messaging platform for consumers. For example, the social network of a consumer may be extended into a map and the physical world associated with the map. Services to extend the social network of a user include finding friends, coordinating rally points, management of proximity based parental controls, serendipitous discovery, and customization and sharing of photos. Venue management may provision consumers with badges, points and rewards, coordinate scavenger hunts and competitions, and provide leaderboard and trivia services. Consumers may also be engaged by collecting feedback and reviews of their experiences, managing favorites and wish lists, conducting surveys and interactive voting, and through the display of messages.

Figure 2:
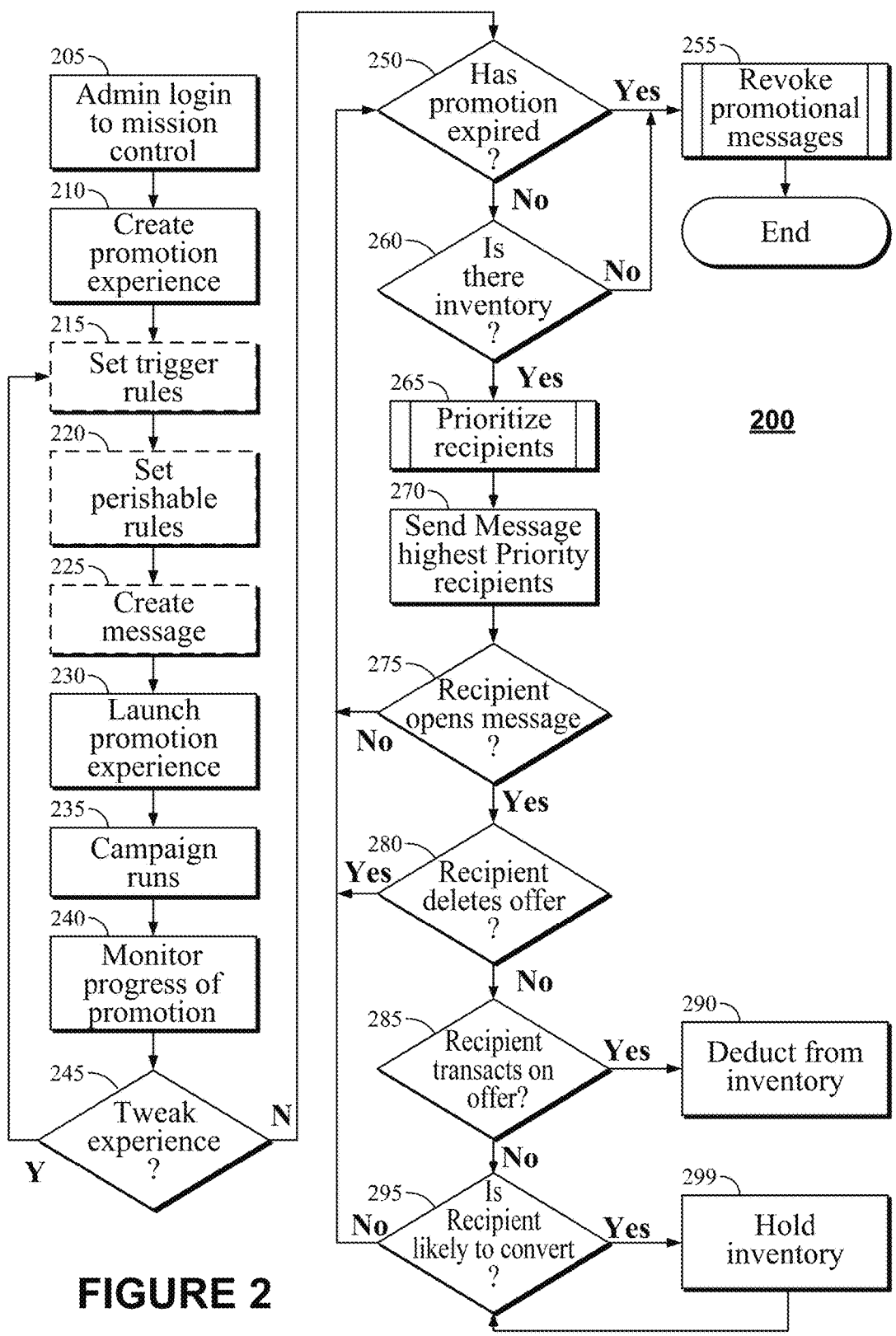
FIG. 2 illustrates a method for messaging users.

FIG. 2 illustrates a method 200 for messaging users. Method 200 may be associated with input received from a marketing department or other entity responsible for managing business strategy within venue management. The method 200 of FIG. 2 may be implemented in hardware (e.g., an application specific integrated circuit) or as software operating in the context of a larger hardware implementation (e.g., software stored in non-transitory memory and executed by a processor). Software for implementing method 200 may be introduced to system 100 by way of portable media or a communications interface such as a wireless or Bluetooth. Various steps of method 200 are optional. Various steps, too, may operate concurrently along-side other operations.

As illustrated in FIG. 2, an administrator may login to an administrative console (e.g., a "mission control" web site) at step 205. A promotion experience is then created at step 210. Creating a promotion experience may include setting trigger rules (215) to control the requirements of the experience, rules related to the perishability of the experience (220) and a message correlating to the experience (225).

Trigger rules generated as a part of step 215 may include one or more rules that determine the instantiation of occurrence of an experience. The rules can include rules related to the location and proximity of an experience, the time or recurring schedule related to the experience, and environmental characteristics required of the experience. Subject to satisfaction of the trigger rules for a given experience, a message generated as a part of step 225 and concerning the experience may be triggered. Trigger rules generated as a part of step 215 may likewise determine which consumers will receive the message.

Location and proximity trigger rules may be used to present the message to consumers who are near or within a geographic area of a point of interest. These rules may be used to specifically and more effectively target messages to those consumers who are near or within a venue, attraction, shop, or service area where the message is appropriate. Effectively targeted messages better ensure receipt by those customers best suited to patronize a particular venue or attraction. Effective targeting likewise ensures that customers not likely to patronize the venue or attraction are not bothered or otherwise inconvenienced by irrelevant messaging.

Time and recurring schedule rules may be used to trigger when a message is created. Messages may be scheduled for a single time in the future, multiple times in the future using recurrence rules (i.e., how many times a message is to be generated), or for a duration between a start and finish date and time. Time and recurring schedule rules may be set as a null value or otherwise omitted in one or more respects to allow the message to be generated at all times (e.g., an ongoing broadcast).

Trigger rules may consider environmental characteristics to determine if and when a message is created. Environmental characteristics may include weather conditions, sports scores, flight arrivals, wait times, event schedules, travel time to a location, or other data collected from external systems. If a certain condition is satisfied (e.g., good weather), then the message may be generated. If a certain condition is not satisfied (e.g., rain in the context of a good weather environmental rule), then the message is not generated.

Trigger rules may include one or more consumer segmentation rules; these rules may be used to determine which types of consumers will receive a message subject to satisfaction of any other trigger rules. Consumer segmentation rules may include demographics or personal data (e.g., height, gender, language, family, and allergies), opt-in preferences, behavioral data such as a number of visits to a venue, attraction, or point of interest as well as browsing history), loyalty status, or other personal preferences.

Perishable rules may be designed at step 220. Perishable rules control when a promotional offer ends, is revoked, or a user is no longer eligible for the same. Perishable rules can include a time when campaign ends such as a lunchtime promotion that ends at 1:00 P.M. or a promotion for a show that starts at 6:00 P.M. Perishable rules can also include an inventory limit such as the number of tickets or seats available for purchase through the promotion or travel time to a promotion location (e.g., whether a user would have sufficient time to arrive at an event location before a promotion begins). A perishable rule may also include an aspect of user behavior such engaging in a specified activity.

Once any requisite rules are set for a promotion in steps 215 and 220, a message for the promotion is created at step 225. The message may specify the nature of the promotion, the location and time of the promotion, and other details concerning the same. The message may include audio, video, images, graphics, text, hyperlinks, and other digital content. Hyperlinks may include links to add the item being promoted to a shopping cart for purchase, single-step purchasing, maps of where the purchase can be redeemed, or deep links within the application or web site. The promotional experience may then be launched at step 230. Launching the experience may include receiving input and review of the experience from an administrator prior to a multicast or broadcast of the promotional message to the appropriate users.

Once launched at step 230, the campaign commences step 235. While the campaign is running, an administrator can review the progress of the promotion at step 240 and adjust the trigger and perishable rules as desired at step 245. Adjustments to trigger and perishable rules would occur in the same fashion as described above with respect to steps 215 and 220.

A determination is made at step 250 for each user as to whether the promotion has ended. A promotion may expire for an individual recipient while still being valid for others. For example, if a user receives a promotion for a show and then the user sees that show later that day but before they respond to the promotion, the promotion may expire for the user. If the promotion has expired, the promotional message is revoked at step 255.

Messages are revoked or expire based on the perishable rules associated with the promotion. For example, a message may be revoked for a user when there is no longer enough time for the user to reach the destination of the promotion before it starts. A message may also be revoked for all users once a show starts. A message may further be revoked for all users once the inventory for a promotion sells out. Messages may be revoked for all users or just for those users that have yet to read the promotional message prior to its revocation.

If a promotion has not expired, a determination is made as to whether there is inventory remaining for the promotion at step 260. If there is no inventory left, the offer is revoked at step 255. If inventory remains, then a prioritization of recipients occurs at step 265.

A recipient list may be continuously re-prioritized at step 265. Prioritization may occur as users enter or exit a venue or engage in other behavior that impacts qualification for the promotion. Prioritization may include a combination of schedule information, level of entitlement, likelihood to respond to a message, likelihood to engage in a financial transaction, or geographic suitability for the message.

Schedule information may be used to prioritize recipients whose schedules are most compatible with the offer of the message. This prioritization may also include a check against event start times, end times, travel time to/from the event, preparation time, and the number of other activities on the schedule of a user. For example, a prioritization operation may prioritize a user with an empty schedule higher than another user with an existing schedule that conflicts with the message contents. Schedule information may be derived from interfacing with a calendar application on a mobile device or by checking against information provided by a user and specific to a venue or event (e.g., identifying musical performances on given stages at a music festival).

Messages may be prioritized by entitlement. Entitlements (and levels thereof) operate to give VIP users an opportunity to respond before other users. This prioritization may include an exclusive time window for VIP users, a dedicated portion of the inventory reserved for VIP users, or a combination of both. In some instances, only VIP users may receive an offer.

Messages may be prioritized by level of entitlement to target messages to users based on goods or services that are currently accessible to the user. The entitlement may include a check against a user purchase history and active entitlements maintained in external systems. For example, step 265 may (re)prioritize a behind the scenes tour reminder message to user who is entitled to the tour through their subscription purchase. A one-time purchase offer message may also be made to a different user that does not have that entitlement.

Messages may also be prioritized by level of entitlement to avoid sending messages to users who already own a good or service. This prioritization may include a check against a user purchase history and active entitlements in external systems to ensure that the user does not already own a superior good or service. For example, users who currently own a platinum-level pass may not receive a message to purchase a gold-level pass if platinum-level is superior to gold-level.

Messages may be prioritized by likelihood that the user will respond. This likelihood may be derived based on a combination of stated preferences, demographic information, purchase history, travel history within the venue, web sites visited, mobile applications used, and historical response to similar messages. A Bayesian algorithm, for example, may be used to prioritize users who are more likely to respond positively above other users. Various other algorithms and methodologies may be implemented in this regard.

Proximity data may be used to prioritize users based on their distance from one or more locations tied to the message. Users who are physically near a location referenced in a message may be prioritized above users who a physically further away. Users that are further away from a location may alternatively be prioritized above users who are closer thereby giving them more time to respond to the message.

Messages are sent to the highest priority recipients at step 270. If a recipient does not open a message at step 275, the method returns to step 250 where a determination is made as to whether the promotion has expired and the method otherwise continues as described above. If the recipient has opened the message, as determined at step 275, the method continues to step 280 where a determination is made as to whether to recipient has deleted the message and corresponding offer.

Deletion of the offer returns the process to step 250. If the recipient has not deleted the offer, however, a further determination is made as to whether the recipient transacts on the offer associated with the promotion at step 285. If the recipient does transact on the offer, the goods of the transaction are deducted from the inventory at step 290. If the recipient does not transact on the offer, a determination is made at step 295 as to whether the recipient is likely to convert on the promotion.

The likelihood of a user to convert is periodically recalculated for each promotion. Typically, messages are not revoked during this part of a promotional campaign. In practice, this means there may be more promotional offers than there are tickets or promotions available in inventory. If the recipient is likely to convert, the inventory is held at step 299. If the recipient is not likely to convert, the method returns to making a determination as to whether the promotion has expired (step 250) and otherwise continues as described above.

Tracking the interactions of any given user with a promotion may be tracked by an application executing on a user mobile device or wearable, an application on a server in communication with the user device, or both. The promotion for each particular user may be updated based on the user interaction with a message transmitted to the particular user as well as other user activity.

Figure 3:
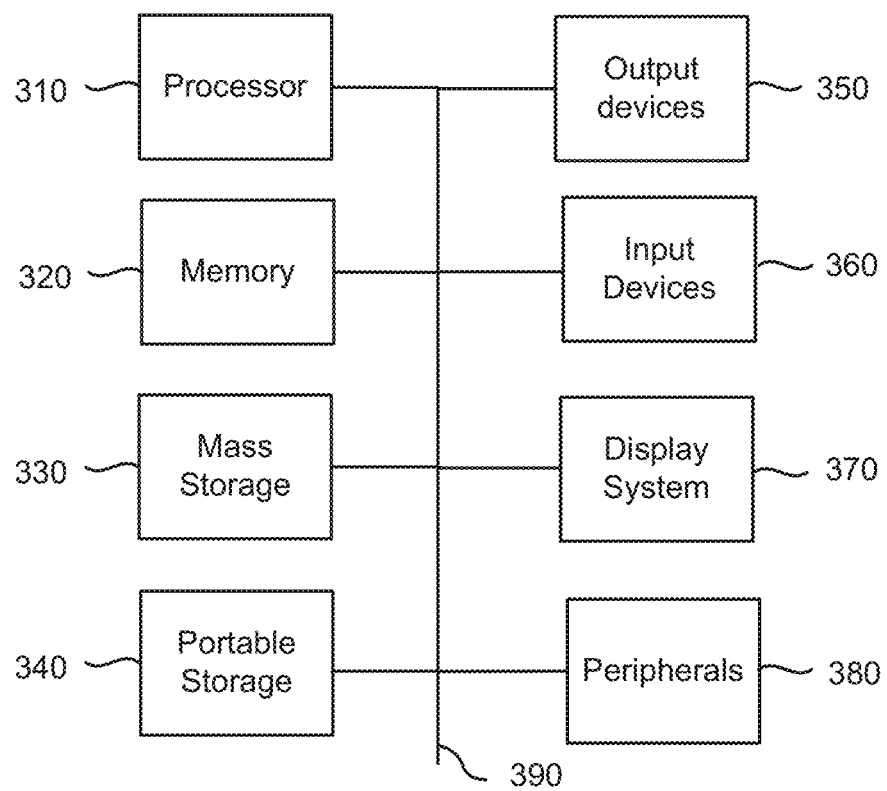
FIG. 3 illustrates an exemplary computing system that may be utilized to implement one or more embodiments of the present invention.

FIG. 3 illustrates an exemplary computing system that may be utilized to implement one or more embodiments of the present invention. System 300 of FIG. 3, or portions thereof, may be implemented in the likes of client computers, application servers, web servers, mobile devices, wearable devices, and other computing devices. The computing system 300 of FIG. 3 includes one or more processors 310 and main memory 320. Main memory 320 stores, in part, instructions and data for execution by processor 310. Main memory 320 can store the executable code when in operation. The system 300 of FIG. 3 further includes a mass storage device 330, portable storage medium drive(s) 340, output devices 350, user input devices 360, a graphics display 370, and peripheral device ports 380.

While the components shown in FIG. 3 are depicted as being connected via a single bus 390, they may be connected through one or more internal data transport means. For example, processor 310 and main memory 320 may be connected via a local microprocessor bus while mass storage device 330, peripheral device port(s) 380, portable storage device 340, and display system 370 may be connected via one or more input/output (I/O) buses.

Mass storage device 330, which could be implemented with a magnetic disk drive or an optical disk drive, is a non-volatile storage device for storing data and instructions for use by processor 310. Mass storage device 330 can store software for implementing embodiments of the present invention, including the method 200 described in the context of FIG. 2.

Portable storage medium drive(s) 340 operates in conjunction with a portable non-volatile storage medium such as a flash drive or portable hard drive to input and output data and corresponding executable code to system 300 of FIG. 3. Like mass storage device 330, software for implementing embodiments of the present invention (e.g., method 200 of FIG. 2) may be stored on a portable medium and input to the system 300 via said portable storage.

Input devices 360 provide a portion of a user interface. Input devices 360 may include an alpha-numeric keypad, such as a keyboard, for inputting alpha-numeric and other information, or a pointing device, such as a mouse. Input device 360 may likewise encompass a touchscreen display, microphone, and other input devices including virtual reality (VR) components. System 300 likewise includes output devices 350, which may include speakers or ports for displays, or other monitor devices. Input devices 360 and output devices 350 may also include network interfaces that allow for access to cellular, Wi-Fi, Bluetooth, or other hard-wired networks.

Display system 370 may include a liquid crystal display (LCD), LED display, touch screen display, or other suitable display device. Display system 370 receives textual and graphical information, and processes the information for output to the display device. In some instances, display system 370 may be integrated with or a part of input device 360 and output device 350 (e.g., a touchscreen). Peripheral ports 380 may include any type of computer support device to add additional functionality to the computer system. For example, peripheral device(s) 380 may include a modem or a router or other network communications implementation (e.g., a MiFi hotspot device).

The components illustrated in FIG. 3 are those typically found in computer systems that may be suitable for use with embodiments of the present invention. In this regard, system 300 represents a broad category of such computer components that are well known in the art. System 300 of FIG. 3 can be a personal computer, hand held computing device, smart phone, tablet computer, mobile computing device, wearable, workstation, server, minicomputer, mainframe computer, or any other computing device.

System 300 can include different bus configurations, network platforms, processor configurations, and operating systems, including but not limited to Unix, Linux, Windows, iOS, Palm OS, and Android OS. System 300 may also include components such as antennas, microphones, cameras, position and location detecting devices, and other components typically found on mobile devices. An antenna may include one or more antennas for communicating wirelessly with another device. An antenna may be used, for example, to communicate wirelessly via Wi-Fi, Bluetooth, with a cellular network, or with other wireless protocols and systems. The one or more antennas may be controlled by a processor, which may include a controller, to transmit and receive wireless signals. For example, processor execute programs stored in memory to control antenna transmit a wireless signal to a cellular network and receive a wireless signal from a cellular network. A microphone may include one or more microphone devices which transmit captured acoustic signals to processor and memory. The acoustic signals may be processed to transmit over a network via antenna.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method comprising:

receiving, by a server executing an application, a trigger rule for a promotion, the trigger rule indicating that the promotion will be available to a plurality of user devices in response to identifying that a plurality of user device locations corresponding to the plurality of user devices are within a previously-defined venue area, the plurality of user devices corresponding to a plurality of users who are located within the previously-defined venue area, wherein the promotion is associated with an event time and with an event location that is within the previously-defined venue area;

receiving, by the server executing the application, a perishable rule for the promotion, wherein the perishable rule indicates when the promotion will end for at least a subset of the plurality of user devices;

determining, by the server executing the application, that the promotion has not expired and that an inventory associated with the promotion remains;

retrieving, by the server executing the application, a plurality of schedules associated with the plurality of users from the plurality of user devices executing a calendar application;

checking, by the server executing the application, the plurality of schedules against the promotion by identifying one or more event start times, one or more event end times, one or more travel times, and one or more scheduled activities;

prioritizing, by the server executing the application and in response to checking the plurality of schedules against the promotion, a highest priority subset of the plurality of users by ranking the highest priority subset of the plurality of users higher than a second subset of the plurality of users based on a first subset of the plurality of schedules associated with the highest priority subset of the plurality of users being most compatible with the promotion while a second subset of the plurality of schedules associated with the second subset of the plurality of users conflicts with the promotion;

transmitting, by the server executing the application, the promotion to one or more of the plurality of user devices associated with the highest priority subset of the plurality of users; and tracking, by the server executing the application, interaction with the promotion by the one or more of the plurality of user devices associated with the highest priority subset of the plurality of users.

2. The method of claim 1, wherein the plurality of users are VIP users, further comprising communicating the promotion to one or more non-VIP user devices after the promotion has been communicated to the plurality of users, wherein the one or more non-VIP user devices correspond to one or more non-VIP users who are not VIP users.

3. The method of claim 1, further comprising receiving the plurality of user device locations from the plurality of user devices, wherein at least one of the plurality of user device locations is generated using a global positioning system (GPS) receiver of at least one of the plurality of user devices.

4. The method of claim 1, wherein the event time is one of a start time associated with the promotion or a end time associated with the promotion.

5. The method of claim 1, wherein the prioritizing the highest priority subset of the plurality of users is also based on physical proximity between the event location and locations of the one or more of the plurality of user devices associated with the highest priority subset of the plurality of users.

6. The method of claim 1, further comprising receiving data corresponding to at least one of the plurality of user device locations that is based on detection by one of the plurality of user devices of a signal strength from hardware other than the plurality of user devices.

7. The method of claim 1, wherein the prioritizing the highest priority subset of the plurality of users is also based on an indication that another good or service is currently available to a first user of the highest priority subset of the plurality of users.

8. The method of claim 1, wherein the prioritizing the highest priority subset of the plurality of users is also based on each of the highest priority subset of the plurality of users being a VIP user and a remainder of users of the plurality of users other than the highest priority subset of the plurality of users not being VIP users.

9. The method of claim 1, further comprising communicating the promotion to a VIP user device corresponding to a VIP user before communicating the promotion to any of the one or more of the plurality of user devices associated with the highest priority subset of the plurality of users.

10. The method of claim 1, wherein the prioritizing the highest priority subset of the plurality of users is also based on a prior purchase history of a first user of the highest priority subset of the plurality of users.

11. The method of claim 1, wherein the prioritizing the highest priority subset of the plurality of users is also based on identifying that a first user of the highest priority subset of the plurality of users lacks a good or service associated with the promotion.

12. The method of claim 11, wherein the prioritizing the highest priority subset of the plurality of users is also based on identifying that the first user of the highest priority subset of the plurality of users also lacks a superior good or service that is superior to the good or service associated with the promotion.

13. The method of claim 1, wherein the prioritizing the highest priority subset of the plurality of users is also based on a historical responsiveness to one or more previous promotions of a first user of the highest priority subset of the plurality of users.

14. The method of claim 1, further comprising identifying that the promotion has ended for a first user of the highest priority subset of the plurality of users includes identifying that a current time has reached or exceeded an expiration time identified by the perishable rule.

15. The method of claim 1, wherein identifying that the promotion has ended for a first user of the highest priority subset of the plurality of users is based on one of identifying that the first user has deleted the promotion, identifying that the first user has used the promotion, or identifying that the first user has left the promotion unopened for at least a predetermined amount of time.

16. The method of claim 1, wherein the perishable rule indicates that the promotion will end for a first user of the highest priority subset of the plurality of users when an inventory associated with the promotion reaches an inventory limit, and wherein identifying that the promotion has ended for the first user is based on identifying that the inventory has reached the inventory limit.

17. The method of claim 1, wherein the prioritizing the highest priority subset of the plurality of users to receive the promotion is based at least in part on travel history within the previously-defined venue area.

18. The method of claim 1, wherein identifying that the promotion has ended for a first user of the highest priority subset of the plurality of users is based on identifying that the first user cannot reach the event location by the event time based on a first travel time between a location of the first user and the event location.

19. The method of claim 1, further comprising re-prioritizing the highest priority subset of the plurality of users, as the highest priority subset of the plurality of users enter or exit the previously-defined venue area.

* * * * *